US007237126B2

(12) United States Patent
Neufeld (10) Patent No.: US 7,237,126 B2
(45) Date of Patent: Jun. 26, 2007

(54) METHOD AND APPARATUS FOR PRESERVING THE INTEGRITY OF A MANAGEMENT SUBSYSTEM ENVIRONMENT

(75) Inventor: E. David Neufeld, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 689 days.

(21) Appl. No.: 09/967,268

(22) Filed: Sep. 28, 2001

(65) Prior Publication Data

US 2003/0065935 A1   Apr. 3, 2003

(51) Int. Cl.
*G06F 21/00* (2006.01)
(52) U.S. Cl. .......................................... 713/194; 726/30
(58) Field of Classification Search ................ 711/163; 713/2, 200, 194; 726/30
See application file for complete search history.

(56) References Cited

U.S. PATENT DOCUMENTS

| | | | | |
|---|---|---|---|---|
| 5,022,077 A | * | 6/1991 | Bealkowski et al. | 711/163 |
| 5,210,854 A | * | 5/1993 | Beaverton et al. | 717/174 |
| 5,491,827 A | * | 2/1996 | Holtey | 711/163 |
| 5,870,520 A | * | 2/1999 | Lee et al. | 714/6 |
| 6,477,648 B1 | * | 11/2002 | Schell et al. | 726/22 |
| 6,581,159 B1 | * | 6/2003 | Nevis et al. | 713/2 |
| 6,711,675 B1 | * | 3/2004 | Spiegel et al. | 713/2 |

OTHER PUBLICATIONS

Angelo et al., "Method and Apparatus to Provide Enhanced Computer Protection," U.S. Appl. No. 09/540,697, filed Mar. 31, 2000.
Angelo et al., "Method and Apparatus for Providing Enhanced Computer Security," U.S. Appl. No. 09/540,812, filed Mar. 31, 2000.
Angelo et al., "Computer System Having Security Features," U.S. Appl. No. 09/540,811, filed Mar. 31, 2000.

* cited by examiner

*Primary Examiner*—Kambiz Zand
*Assistant Examiner*—Andrew L Nalven (57) ABSTRACT

A computer system includes various security measures to insure that semi-permanent operating programs, such a boot blocks and firmware, are updated properly. For example, the system may include a security switch that can enable a host computer to load a replacement program into another computer, such as an appliance server for example, if the other computer fails. Also, if a replacement program is being loaded over a network connection that fails, the loading can resume automatically after re-establishment of the network connection. In addition, certain programs, such as boot blocks, may be verified in an execution memory, such as RAM, and loaded into a more permanent storage memory, such as ROM, only if verified.

15 Claims, 5 Drawing Sheets

METHOD AND APPARATUS FOR PRESERVING THE INTEGRITY OF A MANAGEMENT SUBSYSTEM ENVIRONMENT

FIELD OF THE INVENTION

The present invention relates generally to protecting a computer system and, more particularly, to protecting the updating of firmware or a boot block for a computer system.

BACKGROUND OF THE RELATED ART

This section is intended to introduce the reader to various aspects of art, which may be related to various aspects of the present invention, which are described and or claimed below. This discussion is believed to be helpful in providing the reader with background information to facilitate a better understanding of the various aspects of the present invention. Accordingly, it should be understood that these statements are to be read in this light, and not as admissions of prior art.

A conventional computer system typically includes one or more central processing units (CPUs) and one or more memory subsystems. Computer systems also include peripheral devices for inputting and outputting data. Some common peripheral devices include, for example, monitors, keyboards, printers, modems, hard disk drives, floppy disk drives, and network controllers.

Computer security is becoming increasingly important in today's environment of heavily networked computer systems. As a result, security and integrity features are becoming desirable in the use of personal computers and servers and the various subsystems. Of particular concern is the protection of reprogrammable start up memory of important subsystems embedded in the computer from unauthorized reprogramming or alteration of the computer's non-volatile memory.

Providing security for a system involves providing protection from a variety of possible attacks. For instance, providing security may include protecting a system from viruses. Further, it may include protecting the system from hackers. For a specific company with particular internal systems, it may include authentication of attached machines and prevention of rogue or external devices, which may be foreign to the internal system, from accessing the internal machines.

When a microprocessor based subsystem is initially turned on, the processor executes a series of instructions from a specified startup routine. It stores the basic software to provide for initial set up and configuration of the subsystem and allows the system to initiate and execute subsequent programs.

In the past, the software for an embedded device was generally stored in a read only memory device. However, it has become more common in recent years to store the software for embedded subsystems in a reprogrammable so that the subsystem's software can be upgraded when necessary. Thus, typically the software is stored in FLASH memory or a non-volatile Random Access Memory (NVRAM) to allow the functionality of the subsystem to be changed. The act of changing the contents of non-volatile memory is often called "flashing" the memory.

Flashable or reprogrammable components may be protected using digital signature technology. Specifically, the firmware may contain a protected segment which is generally not flashable or reprogrammable. This segment or "Boot Block" may be used to validate the integrity of the subsystem's memory prior to allowing it to execute. However, if the Boot Block is somehow corrupted the security system may fail. Further, this security measure may be circumvented if the flash memory can be replaced or removed. It is important to verify various start-up and memory components each time the system is powered-on to ensure that the components have not been corrupted. By validating the integrity of the program that the subsystem will execute, it is possible to know the behavior of the subsystem has not been altered either accidentally or intentionally.

Presently, digital signatures are used to authenticate the digital data. Software and firmware used by an embedded subsystem can be considered digital data. Currently there are no methods to assure the integrity of a Boot Block and firmware when firmware updates are required in embedded subsystem that have small amounts of memory. If the subsystem had large amounts of RAM memory, it could absorb the entire image, check the digital signatures and proceed with flashing the EEPROM. But for systems with small amounts of memory, the flashing of the EEPROM (which alters the integrity of the EEPROM) must proceed a piece at a time. For example, if the Boot Block or the firmware image that will be used to update the EEPROM is compromised in some way, by way of a hacker or poor network connectivity, presently there is no method of validating the correctness of the program the subsystem will execute.

Furthermore, the Boot Block typically is not changed very often, although firmware is potentially altered often. This invention allows the independent updating of both the Boot Block and firmware while providing a mechanism to insure the integrity of the software stays intact. The firmware is typically too large to be verified prior to flashing it into memory. Thus, it is possible that an unauthorized or corrupted version of firmware could be flashed into the subsystems EEPROM memory. This invention allows the subsystem to detect this prior to executing the compromised software. The Boot Block is typically small enough that the system can verify its correctness prior to flashing it into EEPROM. Only if it is unaltered and digitally signed by the correct author will the updating fo the Boot Block occur. This invention allows the updating of either piece of software independent of the other while at the same time insuring the integrity of the subsystem's firmware.

The present invention addresses the problems discussed above.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
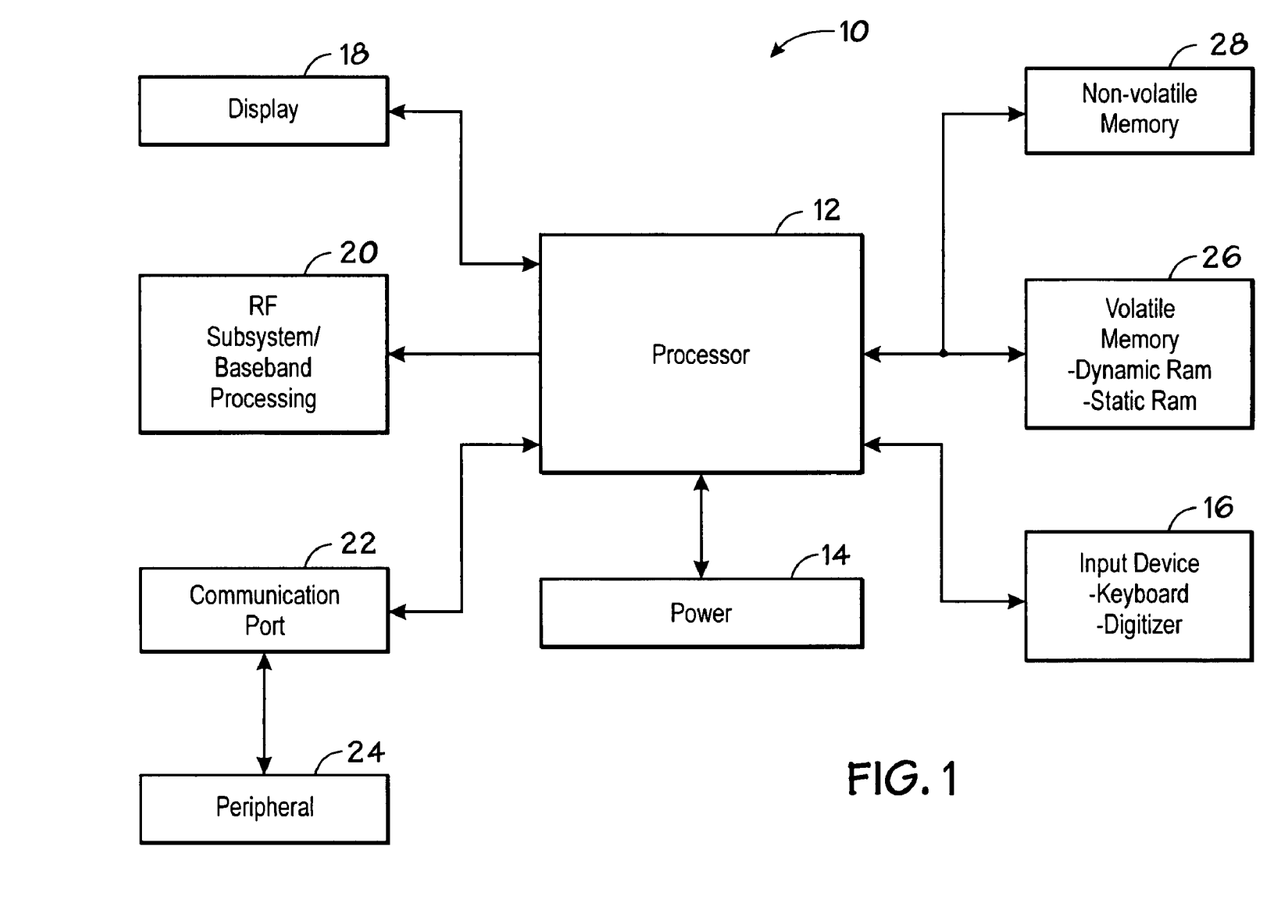
FIG. 1 illustrates an example of a processor-faced system that may include or be used with an embodiment of the present invention.

Turning now to the drawings, and referring initially to FIG. 1, a block diagram depicting an exemplary processor-based device, generally designated by the reference numeral 10, is illustrated. The device 10 may be any of a variety of different types, such as a computer, pager, cellular telephone, personal organizer, control circuit, etc. In a typical processor-based device, a processor 12, such as a microprocessor, controls many of the functions of the device 10.

The device 10 typically includes a power supply 14. For instance, if the device 10 is portable, the power supply 14 would advantageously include permanent batteries, replaceable batteries, and/or rechargeable batteries. The power supply 14 may also include an A/C adapter, so that the device may be plugged into a wall outlet, for instance. In fact, the power supply 14 may also include a D/C adapter, so that the device 10 may be plugged into a vehicle's cigarette lighter, for instance.

Various other devices may be coupled to the processor 12, depending upon the functions that the device 10 performs. For instance, a user interface 16 may be coupled to the processor 12. The user interface 16 may include buttons, switches, a keyboard, a light pin, a mouse, and/or a voice recognition system, for instance. A display 18 may also be coupled to the processor 12. The display 18 may include an LCD display, a CRT, LEDs, and/or an audio display. Furthermore, an RF subsystem/baseband processor 20 may also be coupled to the processor 12. The RF subsystem/baseband processor 20 may include an antenna that is coupled to an RF receiver and to an RF transmitter (not shown). A communications port 22 may also be coupled to the processor 12. The communications port 22 may be adapted to be coupled to a peripheral device 24, such as a modem, a printer, or a computer, for instance, or to a network, such as a local area network, an Intranet and/or the Internet.

Because the processor 12 controls the functioning of the device 10 generally under the control of software programming, memory is coupled to the processor 12 to store and facilitate execution of the program. For instance, the processor 12 may be coupled to volatile memory 26, which may include dynamic random access memory (DRAM) and/or static random access memory (SRAM). The processor 12 may also be coupled to non-volatile memory 28. The non-volatile memory 28 may include a read only memory (ROM), such as an EPROM, and/or Flash memory, to be used in conjunction with the volatile memory. The size of the ROM is typically selected to be just large enough to store any desired or necessary subsystem software, Boot Block, firmware, application programs, and fixed data. The volatile memory, on the other hand, is typically quite large so that it can store dynamically loaded applications. Additionally, the non-volatile memory 28 may include a high capacity memory such as a disk or tape drive memory.

Figure 2:
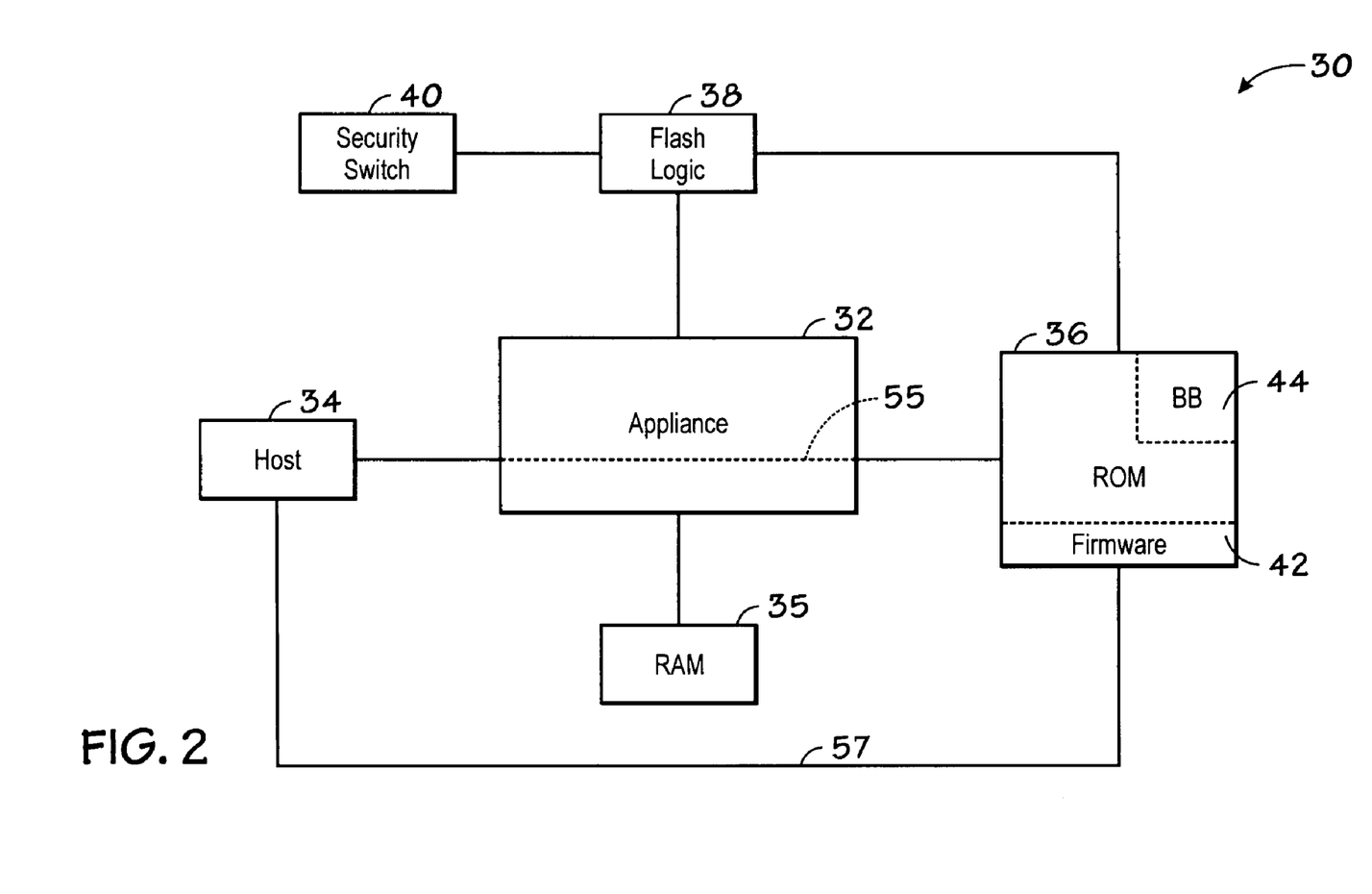
FIG. 2 illustrates a block diagram of an exemplary device in accordance with the present invention.

Referring now to FIG. 2, a more specific system utilizing the present technique is illustrated. The device 30 in this particular embodiment may include a computer appliance 32. It should be noted that the computer appliance 32 may be a system such as a file server, web appliance, network server, etc. Accordingly, the device 30 may be coupled to a network, intranet, the Internet, etc. The appliance 32 may be also coupled to a host computer 34, random access memory (RAM) 35, read only memory (EEPROM) 36, such as a flash EEPROM, and flash logic 38. The EEPROM 36 stores firmware 42 and a boot block 44 that may be utilized by the appliance 32.

During the operation of the device 30 it may be desirable to verify or update the boot block and/or firmware from time to time. The operation of the device 30 in this regard is described with further reference to the flowcharts illustrated in FIGS. 3, 4, and 5. When the device 30 is initially powered up, for example, the appliance 32 checks the boot block 44 to determine whether it is operable. (Blocks 46 and 48.) If the boot block 44 is not operable, the appliance 32 is determined to be inoperable as well. Accordingly, the appliance 32 cannot trigger the flash logic 38 to flash a new boot block 44 into the EEPROM 36. Normally, a situation such as this would require that the device 30 be powered down. However, the device 30 includes a security switch 40 that is coupled to the flash logic 38. The security switch 40 may be a software switch set through the host 34, or it may be a hardware switch set by a user, administrator, or technician. If the security switch 40 is not enabled, then the device 30 is shutdown. (Blocks 50 and 52.) However, if the security switch 40 is enabled, the logic device 38 enables the host 34 to flash a new boot block 44 and/or firmware 42 into the ROM 36. (Block 54.) The host 34 may transmit this code through a connection 55 internal to the appliance 32 or through a connection 57 external to the appliance 32. Once the defective boot block 44 has been replaced by the host 34, the boot block 44 is again checked to determine whether it is operable. (Block 48.)

Figure 3:
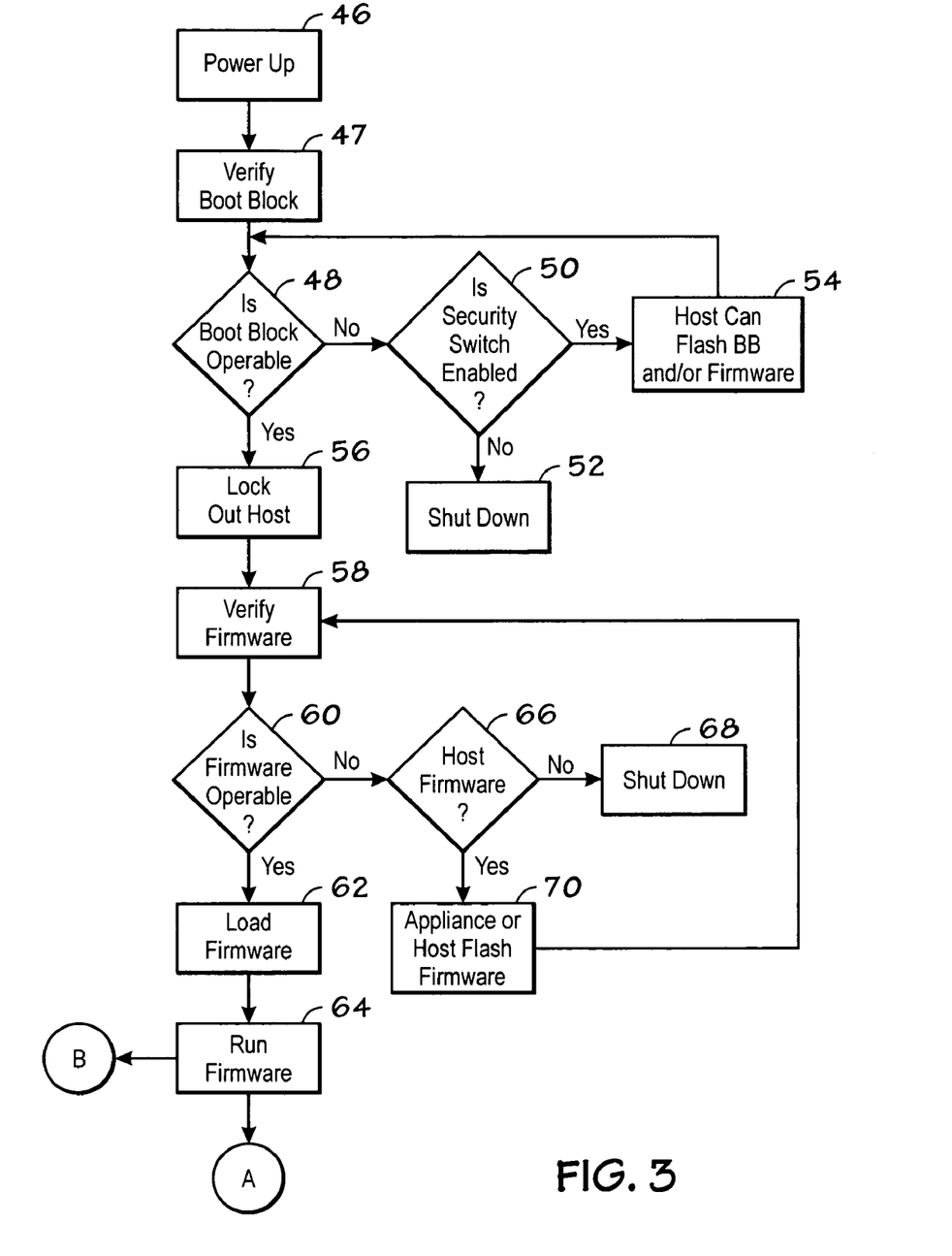
FIGS. 3, 4, and 5 illustrate flowcharts depicting the operation of the device illustrated in FIG. 2.

Once the device 30 determines that the boot block 44 is operable, it locks out the host 34 so that it does not interfere with the operation of the appliance 32 and its ROM 36. (Block 56.) The appliance 32 then checks the authenticity of the firmware 42, using a digital signature, for instance. (Block 58.) The appliance 32 determines whether the firmware 42 is operable, and if so, loads and runs the firmware 42 into the RAM 35. (Blocks, 60, 62, and 64.) Operable means that the firmware was indeed signed (authorized) by some trusted entity and the firmware is intact (unaltered). However, if the firmware 42 is not operable, the appliance 32 checks the host 34 to determine whether the host has firmware that it can flash into the ROM 36. (Block 66.) If the host 34 does not have any firmware to flash into the ROM 36, the appliance 32 is shutdown. (Block 68.) However, if the host 34 does have firmware that can be flashed into the ROM 36, the appliance 32 signals the flash logic 38 to allow the appliance 32 to flash the new firmware 42 into the ROM 36, or, if the security switch 40 is enabled, it controls the flash logic 38 to allow the host 34 to flash the new firmware 42 into the ROM 36. (Block 70.) Once the new firmware has been loaded into the ROM 36, the authenticity of the new firmware 42 is again verified and the firmware is again checked to ensure that it is operable. If so, the new firmware 42 is loaded into the RAM 35 and executed. (Blocks 58, 60, 62, and 64.) Notice that the firmware does not need to be copied to RAM in order to execute it. The RAM 35 is used because RAM memory is typically much faster than EEPROM memory, but the firmware could be executed directly out of EEPROM.

Once the firmware has been loaded into the RAM 35 of the appliance 32, the appliance 32 should function normally.

Figure 4:
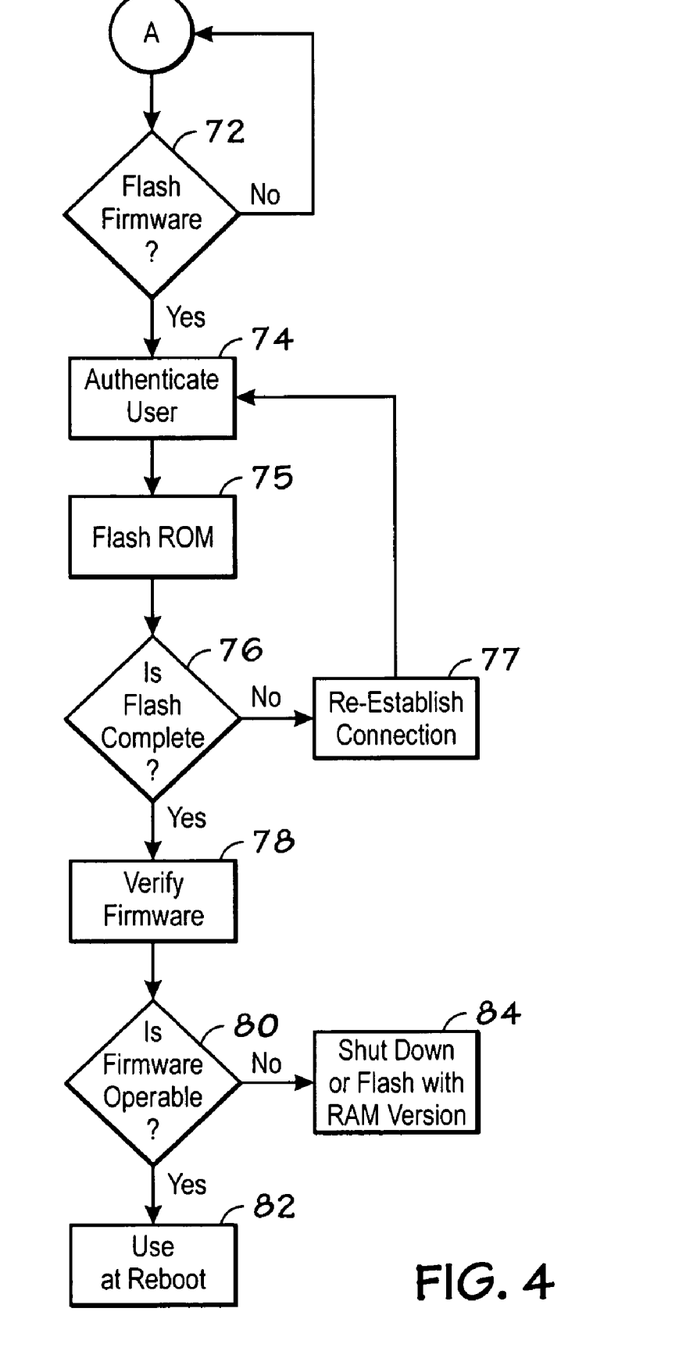

During the normal operation of the appliance 32, it may be desirable to load new firmware. Accordingly, as illustrated in FIG. 4, the device 32 monitors whether new firmware is to be flashed into the ROM 36. (Block 72.) If so, the appliance 32 authenticates the user wishing to flash the new firmware 42 into the ROM 36. (Block 74.) If the user is not authorized to load new firmware, the appliance 32 denies the request and continues to operate normally. However, if the user is authorized to update the firmware 42, the new firmware 42 is flashed from the host 34 into the ROM 36 has described previously. (Block 75.)

However, as discussed previously, the host 34 is coupled to the appliance 32 via a network connection of some type, such as via an intranet or the Internet. Although such connections are normally fairly robust, they do fail from time to time. For example, if the connection is a dial-up connection over the Internet, the connection is typically automatically reestablished if it is momentarily lost. While in most situations, the loss and reestablishment of the network connection does not pose a security risk, it does impose a security risk if it is lost while the new firmware 42 is being flashed into the ROM 36. Accordingly, if such a situation occurs, once the network connection is reestablished, the user is again authenticated and the ROM 36 is automatically reflashed until the new firmware 42 has been successfully loaded into the ROM 36. (Blocks 74, 75, 76, and 77.)

After the updated firmware 42 has been successfully loaded into the ROM 36, it is checked to determine whether it is authentic and operable. (Blocks 78 and 80.) If so, the updated version of the firmware will be used when the device 34 is rebooted. (Block 82.) However, if the updated firmware 42 is not operable for some reason, the appliance 32 may either shutdown, or it may reflash the ROM 36 with the current authentic version of the firmware that is currently being executed in the RAM 35. (Block 84.)

Figure 5:
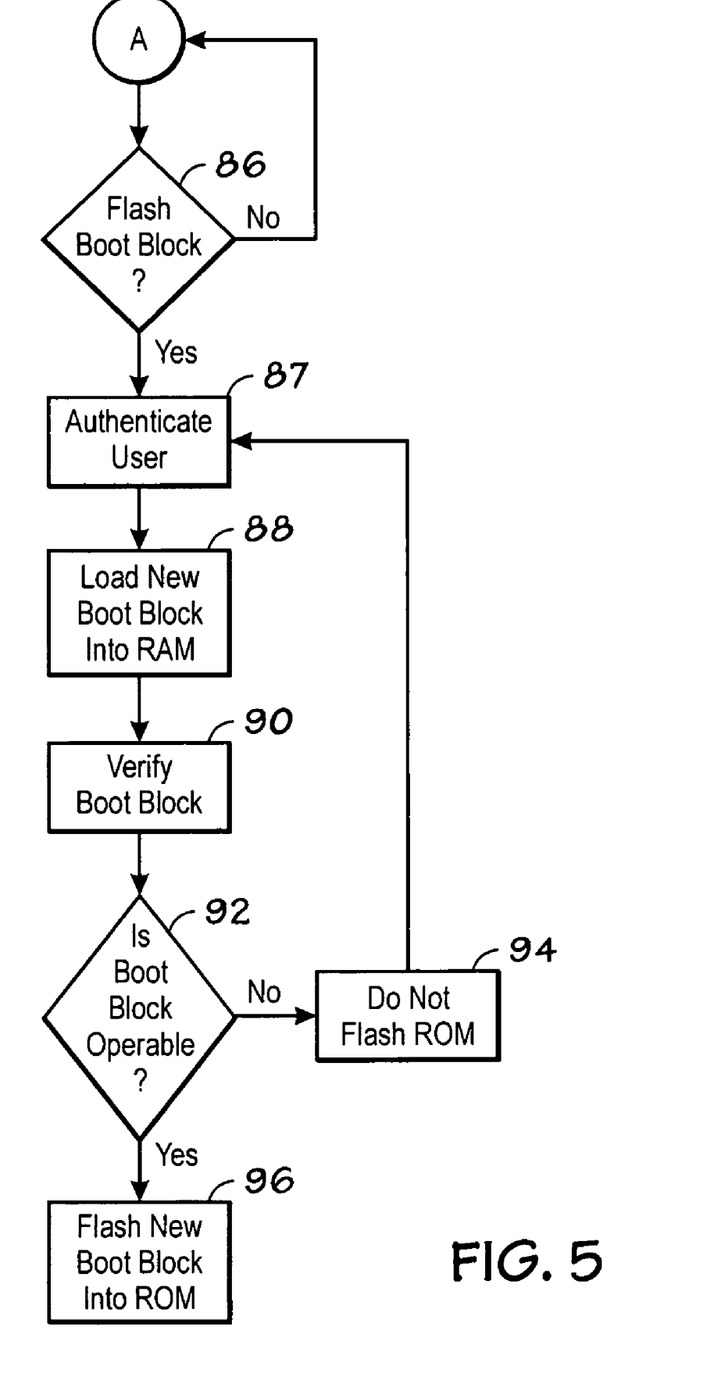

During the normal operation of the device 30, it may also be desirable to update the boot block 44. Accordingly, the appliance 32 monitors to determine whether an updated version of the boot block 44 is to be loaded into the ROM 36. (Block 86.) If an updated version of the boot block 44 becomes available, the appliance 32 authenticates the user to determine whether the user is authorized to update the boot block 44. (Block 87.) If the user is not authorized to update the boot block 44, the device 30 continues to function normally. However, if the user is authorized to update the boot block 44, the appliance 32 loads the updated version of the boot block 44 from the host 34 into the RAM 35. (Block 88.) During normal operation of the appliance 32, the RAM 35 is typically loaded with the subsystem's firmware, application programs, and data. Therefore, the RAM 35 typically does not have enough available memory during normal operation to load yet another version of the firmware 42 when it is desired to update firmware as discussed previously. However, the boot block 44 is typically much smaller than the firmware 42. Accordingly, even during normal operation of the device 30, the RAM 35 typically has enough memory capacity to store a new version of the boot block 44 to be updated.

While the new version of the boot block 44 is in the RAM 35, it is verified and checked to determine whether it is operable and trusted. (Blocks 90 and 92.) If the new version of the boot block 44 is not operable and trusted, it is not flashed into the ROM 36. (Block 94.) However, if the new version of the boot block is verified as authentic and determined to be operable, it is then flashed into the ROM 36. (Block 96.)

As described above, the normal firmware updating process has been separated into two phases. The two portions are the updating of the Boot Block, and the updating of the actual main firmware. Each portion has the ability to check the validity of the other portion prior to allowing it to be both updated and executed. The Boot Block portion cannot be updated until it is verified by the main firmware as correct and legitimate. The main firmware can be updated, but the Boot Block will not transfer control to it until it has been verified as correct and legitimate.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A computer system comprising:
a host computer;
an appliance server operably coupled to the host computer, the appliance server having a storage memory and an execution memory;
a control operably coupled to the appliance server and to the storage memory to control storage of programs into the storage memory, the appliance server being adapted to replace a first program stored in the storage memory with a second program by loading the second program into the storage memory, wherein the appliance server is further adapted to verify the second program stored in the storage memory, wherein verifying comprises authenticating the second program and determining whether the second program is operable, and wherein the appliance server is further adapted to reload the first program into the storage program if the second program is not verified and to execute the second program if the if the second program is verified; and
a security device operably coupled to the control, the security device being adapted to signal the control to permit the host computer to store the second program in the storage memory, the security device comprising a switch, wherein the second program is stored in the storage memory only if the switch is enabled.

2. The computer system, as set forth in claim 1, wherein the storage memory comprises a read only memory.

3. The computer system, as set forth in claim 1, wherein the storage memory comprises a non-volatile memory.

4. The computer system, as set forth in claim 1, wherein the storage memory comprises a flash memory.

5. The computer system, as set forth in claim 1, wherein the execution memory comprises a random access memory.

6. The computer system, as set forth in claim 1, wherein the execution memory comprises a volatile memory.

7. A method of operating a computer system, the method comprising the acts of:
during operation of a computer executing a first program in an execution memory and having a copy of the first program stored in a storage memory, replacing the first program stored in the storage memory with a second program by loading the second program into the storage memory;
verifying the second program stored in the storage memory, wherein verifying comprises the acts of authenticating the second program and determining whether the second program is operable; and if verified, executing the second program,
if not verified, reloading the first program from the execution memory into the storage memory.

8. The method, as set forth in claim 7, wherein the execution memory comprises a random access memory.

9. The method, as set forth in claim 7, wherein the execution memory comprises a volatile memory.

10. The method, as set forth in claim 7, wherein the storage memory comprises a read only memory.

11. The method, as set forth in claim 7, wherein the storage memory comprises a non-volatile memory.

12. The method, as set forth in claim 7, wherein the storage memory comprises a flash memory.

13. The method, as set forth in claim 7, comprising the act of enabling a switch, wherein the second program is loaded into the storage memory only if the switch is enabled.

14. The method, as set forth in claim 7, wherein the first and second programs comprise boot block programs.

15. The method, as set forth in claim 7, wherein the first and second programs comprise firmware programs.

* * * * *

UNITED STATES PATENT AND TRADEMARK OFFICE
CERTIFICATE OF CORRECTION

PATENT NO. : 7,237,126 B2
APPLICATION NO. : 09/967268
DATED : June 26, 2007
INVENTOR(S) : E. David Neufeld et al.

It is certified that error appears in the above-identified patent and that said Letters Patent is hereby corrected as shown below:

On the Title Pg, Item (57), under "Abstract", line 2, delete "a" and insert -- as --, therefor.

In column 2, line 42, delete "fo" and insert -- to --, therefor.

In column 6, line 39, in Claim 1, delete "if the" before "second".

Signed and Sealed this

Fourteenth Day of July, 2009

JOHN DOLL
*Acting Director of the United States Patent and Trademark Office*